United States Patent [19]

Edwin et al.

[11] 4,215,299

[45] Jul. 29, 1980

[54] ADAPTIVE PATH FOLLOWING MOTION CONTROL SYSTEM FOR WELDING HEAD ASSEMBLY

[75] Inventors: Allan I. Edwin; Harold W. Katz, both of Ann Arbor, Mich.

[73] Assignee: Minnesota Mining and Manufacturing Company, St. Paul, Minn.

[21] Appl. No.: 573,898

[22] Filed: May 2, 1975

Related U.S. Application Data

[63] Continuation-in-part of Ser. No. 452,914, Mar. 20, 1974, abandoned.

[51] Int. Cl.$^2$ .......................... B23K 9/12; G05B 19/22
[52] U.S. Cl. .............................. 318/574; 219/124.34; 318/576
[58] Field of Search ................. 219/121 EB, 124, 125, 219/125 PL, 124.34; 318/576, 574, 571, 577

[56] References Cited

U.S. PATENT DOCUMENTS

| | | | |
|---|---|---|---|
| 3,268,805 | 8/1966 | Normando | 219/125 PL X |
| 3,492,552 | 1/1970 | Usami et al. | 318/574 |
| 3,588,463 | 6/1971 | Best | 318/576 X |
| 3,711,717 | 1/1973 | Rich et al. | 318/577 UX |
| 3,855,446 | 12/1974 | Kotova et al. | 219/125 PL |
| 3,911,346 | 10/1975 | Schneekloth | 318/574 X |

Primary Examiner—Robert J. Hickey
Attorney, Agent, or Firm—Krass & Young

[57] ABSTRACT

A position control system for a welder includes a probe pivotably supported on the welding head assembly for motion through an arc extending ahead of the path of motion of the welding head. A sensor supported on the probe connects to a control system which generates an output representing coordinates of points along the center line, and an output proportional to the gap of the line of abutment between a pair of plates to be welded and controls the direction and rate of motion of the welding head along the center line of the abutment as well as the rotation of the head to maintain it in a proper disposition to the seam being welded and to maintain the sensor motion generally in front of the path of motion of the head.

10 Claims, 5 Drawing Figures

ADAPTIVE PATH FOLLOWING MOTION CONTROL SYSTEM FOR WELDING HEAD ASSEMBLY

REFERENCE TO RELATED APPLICATIONS

This application is a continuation-in-part of U.S. Ser. No. 452,914, filed Mar. 20, 1974, now abandoned, and assigned to the assignee of the present application.

BACKGROUND OF THE INVENTION

1. Field of the Invention

This invention relates to a system for sensing the configuration of a path on a workpiece in front of an operating mechanism movable along the workpiece and for controlling the direction and rate of motion of the operating mechanism with respect to the path.

2. Prior Art

A variety of position control systems have been devised to control the motion of an operating head such as a cutter, welder, flame cutter or the like along a path on a workpiece to be operated upon. If the path can be conveniently defined in numerical terms a program can be prepared in advance for generating the appropriate control signals to achieve the desired motion. However, it is often inconvenient to thus define the path, or as in the case of a pair of abutting plates that are to be welded together, no two paths are identical so that the cost of preparing a unique program for each set of parts cannot be justified. Various forms of line-following control systems have been devised for this latter class of applications. These systems include sensors which detect the path to be followed such as the line of abutment between a pair of plates to be welded, or a line marked on a workpiece, and provide signals to a position control system operative to move the operating mechanism along that path. These units may employ any of a wide variety of sensors such as capacitive, magnetic or optical devices depending upon the nature of the path. Typically they include a pair of sensors which straddle the path and develop a differential signal used to determine the relative position of the operating mechanism and the path.

These devices employ servo drives which sense the deviation between the path being followed and the motion of the operating mechanism and modify the operating mechanism in such a direction as to minimize the difference.

SUMMARY OF THE INVENTION

The present invention is directed to sensors for detecting an elongated path formed or marked on a workpiece or a plurality of workpieces to be joined together and to a system employing the sensor output for controlling the motion of an operating member along that path. Rather than employing a sensor or a pair of sensors which straddle the path and sense variations between the position of the operating mechanism and the path, the present invention employs a sensor which repeatedly moves along a line transverse to the path and generates signals representative of the nature of the transverse cross-section of the path. These signals are used to calculate the center point of the path and in certain embodiments of the invention they may be used to determine other characteristics of the path, such as its width, depth and surface or edge characteristics to develop signals to control the rate and direction of motion of the operating mechanism along the path.

In a preferred embodiment of the invention, which will subsequently be disclosed in detail, the probe is supported on an arm carried by the operating device which pivotably reciprocates along an arcuate path at the end of an arm extending ahead of the operating device. Both the operating device and the arm are pivoted about an axis extending normally to the surface of the workpiece so that the sensor motion remains tangent to the instantaneous direction of motion of the operating device.

A drive system for the operating device and the sensor may be equipped with a Z axis control to maintain the height of the sensor above the workpiece constant independently of variations in the contour of the workpiece and to prevent the operating head and sensors from impacting the workpiece.

In the preferred embodiment of the invention the sensor signals are processed digitally to develop control signals for the drives. The sensor probe is reciprocated at a rate fast in comparison to the rate of motion of the operating means along the path and the output signals from each sweep are processed to determine the coordinates of the center point of the path relative to the present direction of motion of the operating means. These coordinates are stored and modified as the welding head moves, to maintain them as incremented positions with respect to the instantaneous position of the head. When the head reaches the immediate vicinity of a coordinate set they are used to control the direction of motion of the head and the change of angle of the head.

In applications such as welders wherein the rate of motion of the operating head is preferably controlled as a function of the amount of weld needed, i.e., path or groove width being traversed, the system calculates the width of the path as sensed by the probe and controls the rate of motion of the head as an inverse function of this thickness. In other embodiments the probe might sense different parameters of the path such as its contour in a Z direction to control the manner of action of the operating device.

The present invention therefore combines the advantages and economies of the prior art servo-type systems which measure the deviation between the actual and desired positions of the operating means and drive the operating means in such a way as to minimize that difference, and numerical control systems which develop a pre-planned digital path for the motion of the operating head. The present invention effectively generates a digital program for the drive system by sensing the area in front of the operating device and plotting its contour in digital signals. Since this plotted contour is a function of the present position of the device the system is not susceptible to accumulation of error in the same manner as an incremental open loop numerical control system.

Other objectives, advantages and applications of the present invention will be made apparent by the following description of a preferred embodiment of the invention. The description makes reference to the accompanying drawings in which.

Figure 1:
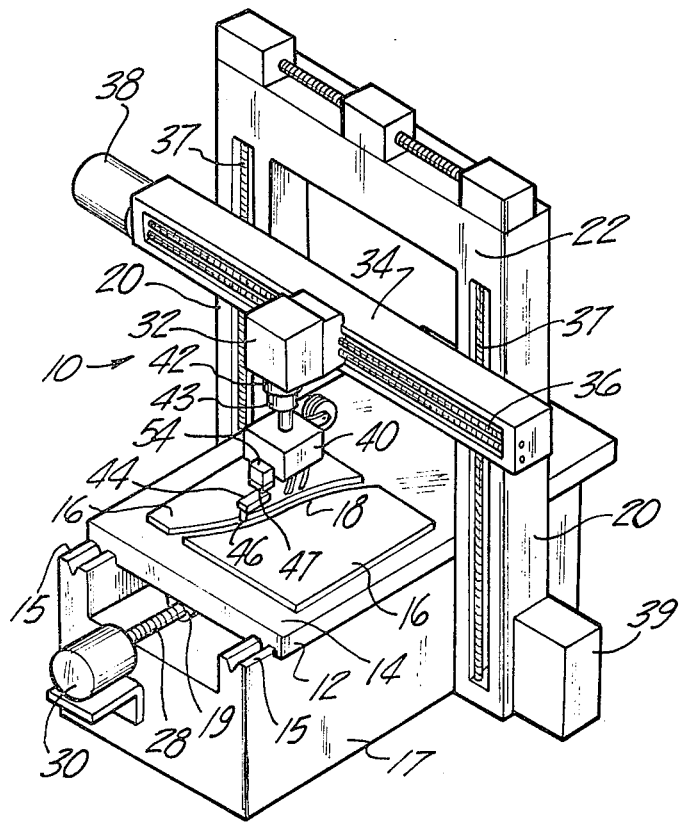
FIG. 1 is a perspective view of a gantry-type welding machine equipped with an automatic path following system formed in accordance with the present invention.

Referring to the drawings, FIG. 1 illustrates a gantry-type arc welder 10 formed in accordance with the present invention. The machine has a bed 12 with a flat upper surface 14 supported for horizontal motion on a pair of ways 15 fixed to a base 17. A drive motor 30 fixed to the base 17 rotates a lead screw 28 which is threaded through a nut 19 affixed below the bed 12 to control the position of the bed in the X axis. In alternate embodiments the bed could be fixed and the head could be moved in both the X and Y coordinates.

A pair of plates 16 to be welded together are affixed to the surface 14 in any conventional manner with their edges which are to be welded together abutting one another so as to form a line or curve 18. The line 18 may vary in width from point to point depending upon the precision used to form the contoured sections to be welded together. At some points the plates may be in direct abutment to one another and at other points they may be slightly spaced from one another.

A gantry consisting of a pair of vertical columns 20 is supported on opposite sides of the bed 12, and a bridge 22 which joins the upper ends of the two columns 20 extends over the bed 12. A head 32 is supported for motion parallel to the bridge 22 and transverse to the rails 24 on a rail 34 supported on the vertical columns 20. A lead screw 36, driven by a Y axis drive motor 38 extends beneath the bridge 22 and connects to the head 32 to control its motion across the width of the bed.

The rail 34 is moved vertically on the columns 20 through lead screws 37 driven by a Z axis control motor 39.

An arc welding head 40 of conventional construction is supported beneath the head on a rotational adjustment mechanism 42 that rotates the welder about an axis normal to the bed 12 and centered over the welder tip. An angle transducer 43 provides an electric output signal proportional to the angle between the head 40 and the machine X and Y coordinate system.

The welder 40 carries a probe 44 which reciprocates through an arc and supports a sensor 46 at its far end which develops signals relating to the form of the path 18. A second angle transducer 47 provides a parallel digital output proportional to the instantaneous angle of the sensor relative to the welder head 40 as opposed to the machine X and Y axes. Signals from the sensor are processed by a control system and used to control the drive motors 30 and 38 to move the welder 40 along the path 18. Means may also be provided for sensing the contour of the path 18 in the vertical direction and controlling the Z axis drive motor 39 to maintain the welder and the sensors at a proper height above the path.

Figure 2:
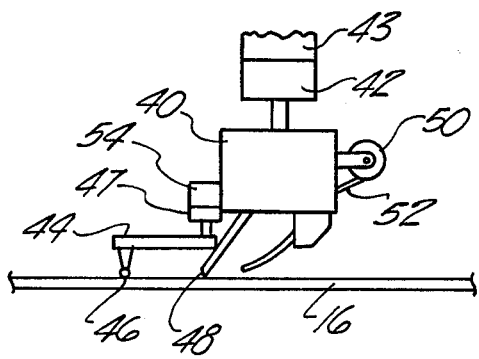
FIG. 2 is a detailed elevational view of the operating head and sensor of the machine of FIG. 1.

The design of the welder head is illustrated in detail in FIG. 2. The welder 40 includes a rod support 48 that extends downwardly to proximity with the workpiece 16 and a reel 50 for carrying and dispensing welding rod 52. The probe 44 is reciprocated through an arc of approximately 80° by a drive motor 54. The sensor 46 is disposed on the far end of the probe in close proximity to the surface of the workpiece 16.

Figure 3:
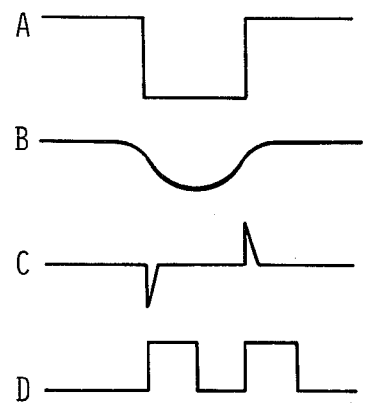
FIG. 3 is a diagram of the sensor outputs generated during the operation of the system of FIG. 1.

The sensor 46 is preferably of the conventional inductive type including a coil which establishes a magnetic field. The inductance of the coil is a function of the contour of the surface of the workpiece 16 and its proximity to the coil and the conductive and magnetic properties of the surface. This inductance controls the current drawn by the coil. As the probe moves over the workpiece surface this current is substantially constant. When the probe reaches the edge of the workpiece there is a sharp increase in the inductance of the coil if the surface was conductive and non-magnetic and the current decreases substantially. In other embodiments of the invention capacitive probes, X-ray probes, photosensors and the like might be used to provide information relating to the path of the workpiece being scanned by the sensor 46. In general, as the sensor swings parallel to the surface of the workpiece 16 it will provide a relatively stable output signal until it reaches the edge 18. The output signal will then drop, or rise, sharply and then remain stable until the edge 18 of the abutting plate 16 is reached when the signal is returned to its original level. The output is illustrated in FIG. 3, line A.

Figure 4:
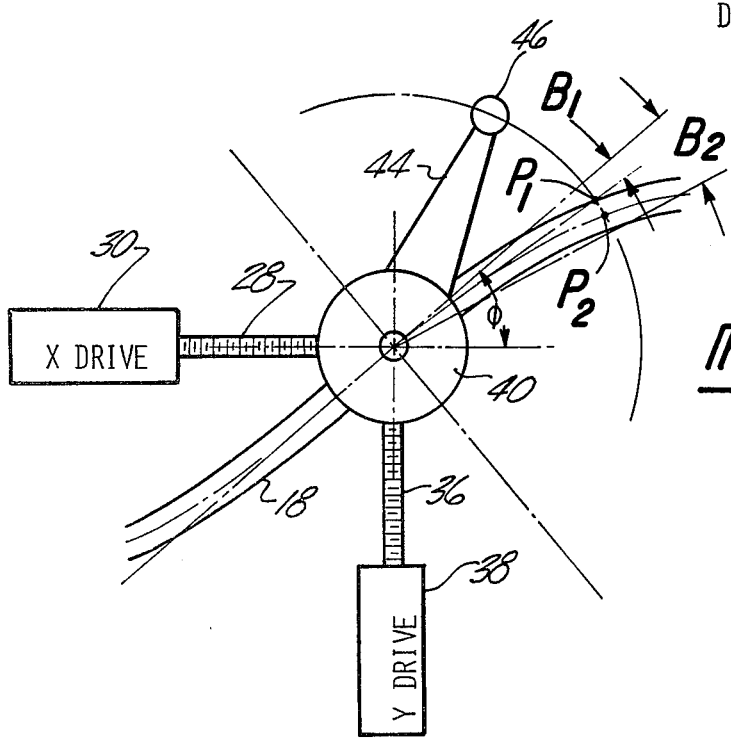
FIG. 4 is a diagram illustrating the geometric relationships between the path and the workpiece and sensor heads.

FIG. 4 illustrates the geometric relationship between the welder 40, the probe 46 and the path 18 in diagramatic form. The welder 40 is moved by the X-axis drive 30 acting through the lead screw 28 and a Y-axis drive 38 acting through the lead screw 36. At any instant its direction of motion is tangential to the center of the path 18 at its point of disposition on the path. Its direction of motion makes an angle $\phi$ with respect to the machine X-axis as measured by the transducer 45.

The center line 50 of the groove generally very accurately follows the same contour as the edges. The sensor 46 provides one output signal, which will be detected in a manner illustrated in connection with the description of FIG. 5, when it passes over the point $P_1$ on one edge of the groove and a second output signal when it passes over point $P_2$ on the opposite side of the groove. Lines extending between these points and the center of the welding head 40 make angles $B_1$ and $B_2$ with respect to the direction of motion of the welding head at the time of generation of the signals and these angles are encoded in the output of transducer 47 at those times. The coordinates of the point C which represents the intersection of the sensor 46 with the center line of the groove 18 (the midpoint of line $P_1$-$P_2$), are defined in the following manner:

$$X_C = \frac{R(\sin B_1 - \sin B_2)}{2} \; ; \; Y_C = \frac{R(\cos B_1 - \cos B_2)}{2}$$

where R=the radius of the arm 44.

These coordinates are with respect to the sensor frame of reference and must be translated into coordinates in the XY coordinate system of the machine in order to provide control signals for the machine drive motors.

Thus:

$$X_M = X_C \sin \phi + Y_C \cos \phi$$

and $$Y_M = Y_C \sin \phi - X_C \cos \phi$$

where $X_M$ and $Y_M$ are the coordinates of point C along the axes defined by screws 28 and 36 and $\phi$ is the output of transducer 43.

Figure 5:
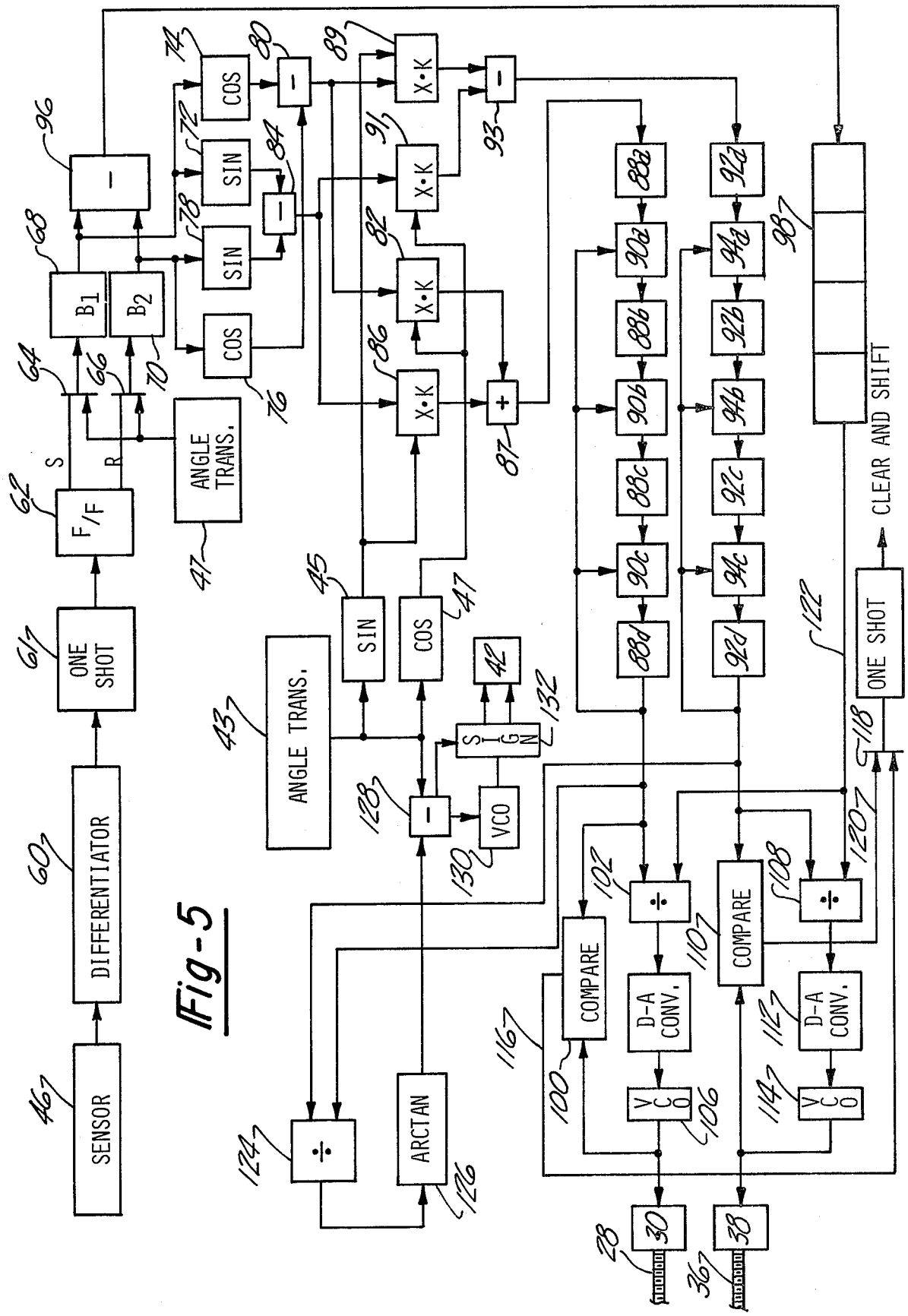
FIG. 5 is a schematic diagram of the control system.

FIG. 5 illustrates the control system that receives the outputs of the sensor 46 and the angle transducers 43 and 47, performs this calculation, and generates signals for the motor 42 which control the direction of the welder head and the probe, and the X and Y drive units 30 and 38.

The outputs from the sensor 46 are provided to the circuit of FIG. 5 when the arm 44 swings in a clockwise direction. No sensor signals are provided during the counterclockwise return of the sensor. As illustrated in FIG. 5 these signals are first provided to a differentiator 60 which provides sharp output pulses of opposite sign when the sensor 46 crosses the two edges in the path 48. These signals are provided to a one-shot multi-vibrator 61 which provides unidirectional output pulses, independently of the sign of its input signals, to a flip-flop 62. These signals act to alternately set and reset this flip-flop.

The set output of the flip-flop 62 conditions an AND gate 64 while the reset output conditions a second AND gate 66. These gates are accordingly sequentially opened and each provides the parallel digital output of the angle transducer 47 to a pair of registers 68 and 70 which are termed $B_1$ and $B_2$. The register $B_1$ accordingly receives an angle signal when the sensor 46 passes point $P_1$ and the register 70 receives the output of the transducer 47 when the sensor passes the opposite side of the groove at point $P_2$. The registers 68 and 70 are cleared between scans of the sensor 46 as will be subsequently described.

The contents of the register 68 are provided to circuits 72 and 74 which respectively generate outputs proportional to the sine and cosine of the angle contained in register $B_1$. Similarly, the outputs of the $B_2$ register 70 are provided to a pair of digital units 76 and 78 which respectively generate signals proportional to the cosine and sine of the angle expressed in the number contained in register 70.

The output of the two cosine registers 74 and 76 are subtracted from one another in a unit 80 and the output of that unit is provided to a digital multiplier 82 which also receives a signal proportional to the sine of the output of the angle transducer 43, a signal proportional to the angle between the welding head and the machine X and Y axes, as derived by unit 45. Similarly, the outputs of the two sine registers 72 and 78 are subtracted from one another in a unit 84 and then provided to a multiplier 86 which also receives a signal proportional to the cosine of the output of the angle transducer 43 generated by unit 47. The multipliers 82 and 86 also multiply their two inputs by a constant factor K proportional to the radius of the arm 44 divided by two.

The outputs of the multipliers 82 and 86 are provided to an adder 87. The output of this adder, representative of the X coordinate of point C in machine coordinates is provided to a register 88a which forms a first unit of a chain of registers 88b, 88c and 88d which are serially interconnected by digital subtracting units 90a, 90b and 90c. Only four registers and three intermediate subtractors are illustrated in this chain, but the chain could have greater or fewer units, depending upon the radius of the arm 44, its frequency of sweep, and similar factors. The register units 88 each store one point on the series of points on the center line of the groove 18 sequentially intersected by the sensor 46.

The outputs of the subtractors 80 and 84 are respectively provided to multipliers 89 and 91 which also receive the outputs of the sine generator 45 and the cosine generator 47 respectively. Their outputs are substracted by unit 93 and provided to a register 92a forming part of a group of registers 92b, 92c and 92d, serially interconnected by subtractor units 94a, 94b and 94c. Both the chains of registers 88 and 92 act as shift registers, simultaneously outputting their present contents to the next register in the chain, through their interconecting subtractors, and receiving a new number from the forward end of the chain. The subtractors 90 and 94 each have their second input from the output of the last register in the chain, 88d or 92d; thus, each time a number is outputted from the chain it is subtracted from each of the numbers still in the chain. This process maintains the X and Y coordinates stored in the register in incremental form; that is, each representing the coordinates of a point taken with respect to the present position of the head 44 as opposed to the position of the head when they were originally sensed.

In order to derive a signal proportional to the width of the groove 18 at the points defined by the contents of the registers 88 and 93 so that the control system may be moved at a rate inversely proportional to that width, (proceeding more slowly and depositing more welding metal where the groove is the widest), the contents of the angle registers 68 and 70 are subtracted from one another in a unit 96 and this difference number is provided to the first stage of a shift register 98, having a number of stages equal to the number of registers 88 and 92. This width related signal is independent of the point of the head at which it was measured so no subtraction is necessary to maintain it in incremental form but the contents of the stages of the registers 98 are advanced in synchronism with the advance of the X and Y coordinates through the registers 88 and 92, respectively.

The output of the last register 88d in the register chain that stores and transfers the Y coordinates of a point is provided to a comparator register 100 as well as to each of the subtractors 90a, 90b and 90c. It is also provided to a divider 102 that receives the output of the last stage of the shift register 98, containing signals proportional to the width of the groove. The signal outputted from the register 98 represents the width of the groove at the point represented by the X and Y coordinates simultaneously outputted by the register stages 88d and 92d.

The divider 102 provides an output directly proportional to the Y coordinate as provided by register stage 88d and inversely proportional to the path width. This signal is provided to a digital-to-analog converter 104 which feeds a voltage controlled oscillator 106. The VCO 106 provides a train of pulses at a rate proportional to the output of the divider 102 which are used to drive the Y axis drive motor 30. The output pulses from the VCO 106 are also used to count down the comparator 100. The comparator provides an output signal when the number of pulses outputted by the VCO equal the last Y coordinate number provided by the register 88d.

Similarly, the output of the register stage 92d representing the X coordinate of the next point on the path in incremental machine coordinates is provided to each of the subtractors 94, in order to maintain the numbers in the previous registers 92 in incremental form; is provided to a divider 108 which also receives the output of the last stage of the register 98; and is provided to a comparator storage register 110.

The output of the divider 108 is provided to a digital-to-analog converter 112 which controls the frequency of output of pulses from a voltage controlled oscillator 114. The oscillator provides its output pulses to the Y-axis drive motor 38 which rotates the lead screw 36.

The output of the VCO 112 is also provided to the comparator 110 and is used to count down the comparator.

When the comparator 110 receives a number of pulses from the VCO 106 equal to the X coordinate provided to it by the register 88d, it provides an output signal on line 116 to an AND gate 118. Similarly, when the comparator 110 receives a number of pulses from the voltage controlled oscillator 114 equal to the Y coordinate that it received from register 92d, it provides an output signal on line 120 to the AND gate 118. The presence of both of these signals provides a signal to a one-shot multi-vibrator 122 which generates a clear and shift signal that is sent to a number of units in the system. These signals clear the registers 68 and 70 and shift the contents of the register chains 88, 92 and 98.

In this manner the system continually generates X and Y coordinates for the next incremental motion of the machine, and controls this motion at a rate inversely proportional to the width of the groove 18 at the point.

The system also computes the necessary incremental rotation of the welder head to maintain the head motion along a line tangential to the curve and rotates the head through this incremental position.

The embodiments of the invention in which an exclusive property or privilege is claimed are defined as follows:

1. A position control system for the head of a machine supported for motion along a pair of perpendicular axes and for rotation about an axis normal to said perpendicular axes, operative to move a workpiece and the head relative to one another along a path on the workpiece, comprising: first motor means for moving the workpiece and the head relative to one another along one of said perpendicular axes; second motor means for moving the workpiece and the head relative to one another along the second of said perpendicular axes; third motor means for rotating the head about the axis normal to said perpendicular axes; a sensor operatively supported on the head; means for moving the sensor in a regular pattern to cause the sensor to traverse the path on the workpiece in advance of the motion of the head relative to the workpiece; and electronic means for receiving the outputs of the sensor, for generating a plurality of sets of electrical signals representative of desired incremental movements of the operating head relative to the workpiece along the two perpendicular axes, for providing said signals to said first and second motor means, for generating a control signal representative of the required incremental rotation of the head about said axis normal to said perpendicular axes in order to maintain the direction of motion of the head relative to the workpiece tangential to the path at each instantaneous point, and for applying said last control signal to said third motor means, said electronic means including means for generating a set of signals representing the coordinates of the path point traversed by the sensor relative to the position of the head at the time of traverse, memory means for storing a plurality of said coordinate sets, and means for modifying said coordinate sets as the head moves along the path to maintain the coordinates representative of the distances between the instantaneous position of the head and said point traversed by the sensor.

2. The system of claim 1 wherein the means for generating a set of signals representing the coordinates of the path point traversed by the sensor relative to the position of the head includes a transducer supported between the head and the probe operative to provide an output signal proportional to the instantaneous angle of the probe relative to the head.

3. The position control system of claim 1 wherein said memory means for storing a plurality of said coordinate sets comprises a plurality of digital registers and said means for modifying said coordinate sets as the head moves along the path to maintain the coordinates representative of the distances between the instantaneous position of the head and said point traversed by the sensor includes means for modifying the contents of said registers by factors proportional to the incremental motions of the head along the respective coordinates.

4. The system of claim 1 wherein the path is defined by a pair of separated walls of the workpiece and including means for operating upon the sensor signals to derive signals proportional to the width of the separation in the direction of motion of the sensor; and means for controlling the rate of motion of the operating head in the area of said point as an inverse function of the width of the separation.

5. The system of claim 4 including memory means for storing a plurality of signals proportional to the dimension of the path in a direction of motion of the sensor at a plurality of spaced points between the instantaneous position of the head on the path and the point on the path traversed by the sensor and wherein said means for controlling the rate of motion of the operating head in the area of said point as an inverse function of said dimension signal utilizes the oldest signal in said memory.

6. The position control system of claim 1, wherein said means for generating a control signal representative of incremental rotation of the head about said axis includes means for generating a signal proportional to the instantaneous angle of the head relative to the machine and means for generating a signal proportional to the instantaneous direction of motion of the head relative to the machine; and means for generating a signal proportional to the difference between said last two signals.

7. A position control system for the head of a machine supported for motion along a pair of perpendicular axes relative to a workpiece and for rotation about an axis normal to said perpendicular axes, operative to move the head relative to the workpiece along a path on the workpiece, comprising: first motor means for moving the workpiece and the head relative to one another along one of said perpendicular axes; second motor means for moving the workpiece and the head relative to along the second of said perpendicular axes; third motor means for rotating the head about the axis normal to said perpendicular axes; a sensor supported on the head; means for moving the sensor in a regular pattern relative to the head so as to cause the sensor to regularly traverse the path on the workpiece in advance of the direction of motion of the operating head relative to the workpiece; means for generating an electric signal proportional to the angle of the sensor relative to the head; means for receiving the outputs of the sensor and said means for generating signals proportional to the angle of the sensor relative to the head and for generating a series of sets of signals each representative of the distances between the head and the sensor at the instant it traverses the path in front of the head along perpendicular axes; means for storing said plurality of sets of signals; means for modifying said stored signal sets to maintain the stored signal sets representative of the instantaneous coordinates of the distance between said points traversed by the sensor and the position of the head; and means for generating control signals for said first, second and third motor means operative to cause the member to move relative to the workpiece along the path and to cause the operating head to be maintained in a direction tangential to the instantaneous curvature of the path at the point of the head.

8. The position control system of claim 7 further including means for generating an electric signal proportional to the angle of the head relative to the machine and for providing said signal to said means for receiving the outputs of the sensor and said means for generating signals proportional to the angle of the probe relative to the head to generate a series of sensor signals each representative of the distances between the head and the sensor at the instant it traverses the path in front of the head along perpendicular axes, so that said distances are representative of the distances along the directions of motion of the head relative to the machine.

9. A position control system for the head of a machine supported for motion along a pair of perpendicular axes relative to a workpiece and for rotation about an axis normal to said perpendicular axis, operative to move the head relative to the workpiece along a variable width path on the workpiece, including: drive systems for moving the workpiece and the head relative to one another along said pair of perpendicular axes; a sensor supported on the head; means for moving the sensor in a regular pattern so as to cause the sensor to traverse the path on the workpiece in advance of the motion of the head relative to the workpiece; electronic means for receiving the output of the sensor and generating a control signal proportional to the width of the path traversed by the sensor; and means for controlling the drive system with said signal to move the head along the path relative to the workpiece at a rate which is a function of said width related signal.

10. The control system of claim 9 including memory means for storing a plurality of said width related signals and for sequentially applying the signals to said control system.

* * * * *